Oct. 30, 1951     S. E. HAZELQUIST     2,572,929
METHOD OF PREPARING MAGNESIUM BISULFITE COOKING LIQUOR
Filed March 30, 1950
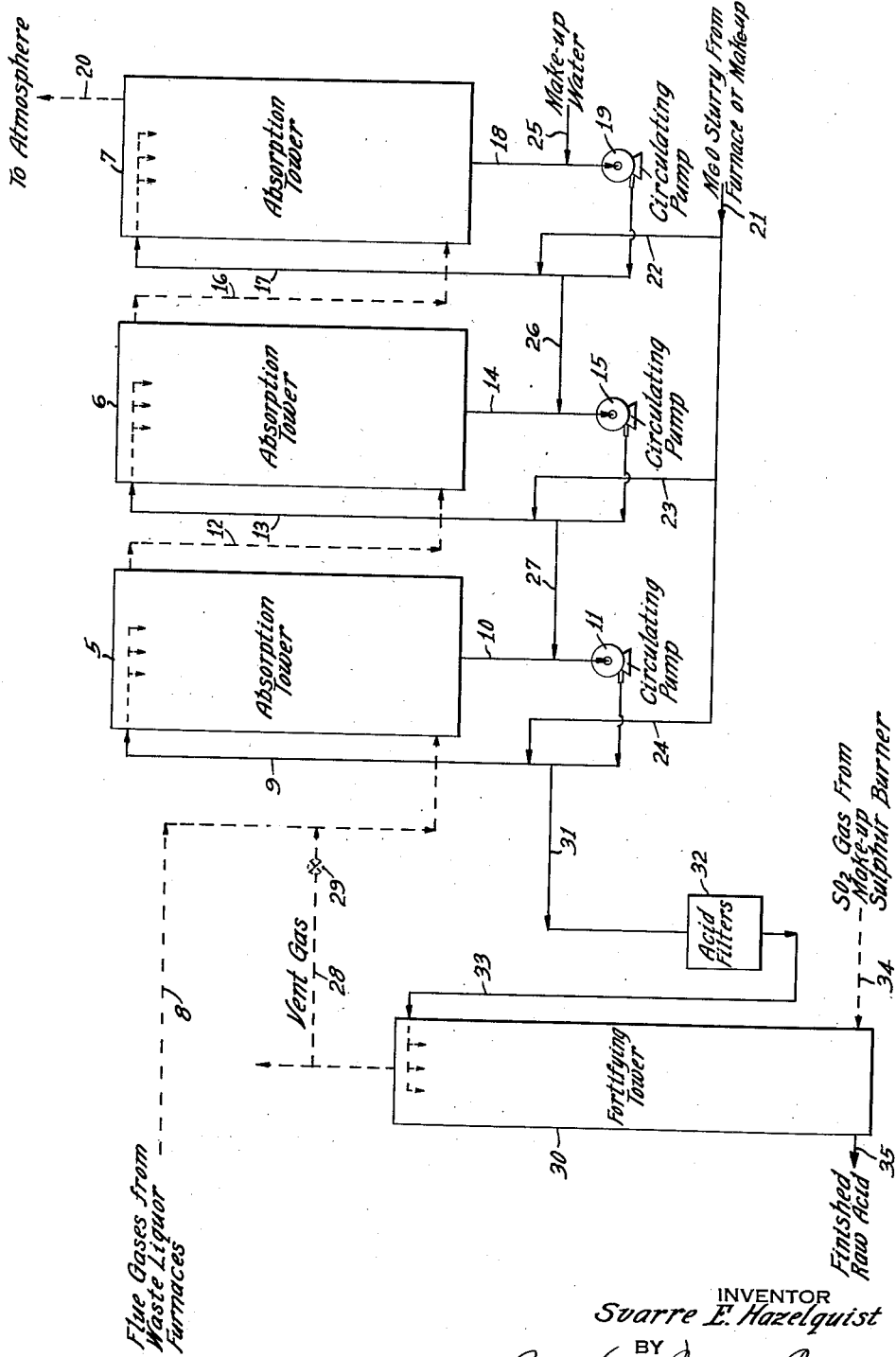
INVENTOR
*Svarre E. Hazelquist*
BY
*Pennie, Edmonds, Morton and Barrows*
ATTORNEYS Patented Oct. 30, 1951

2,572,929

UNITED STATES PATENT OFFICE 2,572,929

METHOD OF PREPARING MAGNESIUM BISULFITE COOKING LIQUOR

Svarre E. Hazelquist, Longview, Wash., assignor to Weyerhaeuser Timber Company, Tacoma, Wash., a corporation of Washington Application March 30, 1950, Serial No. 152,800

2 Claims. (Cl. 23—130)

This invention relates to the production of paper pulp by the magnesium base sulphite process, and more particularly to an improvement in the regeneration of the magnesium bisulphite liquor as described, for example, in the patent to Palmrose No. 2,351,780.

In the magnesium base sulphite process, the waste liquor from the digesters is separated from the pulp and, after concentration in an evaporator system, the waste liquor is burned in suitable furnaces to recover sulphur dioxide and an ash consisting of magnesium oxide. The ash is mixed with water to form a slurry and is fed to towers in which it contacts and absorbs sulphur dioxide from the furnace gases resulting from the burning of the waste liquor, thus producing magnesium bisulphite liquor which, after fortification with additional sulphur dioxide from sulphur burners, is suitable for use as a cooking liquor in the digesters.

Magnesium bisulphite is very soluble, and consequently the procedure is well adapted to produce the cooking liquor. However, magnesium monosulphite is only sparingly soluble in water (0.262% $MgSO_3$ at 20° C.). The presence of some monosulphite in the liquor is desirable. It is necessary, however, to avoid the formation of magnesium monosulphite in excess of its solubility in the liquor. Otherwise the monosulphite will precipitate and will be filtered out of the system with resulting loss of magnesium oxide and sulphur dioxide.

The reaction of the sulphur dioxide with the magnesium oxide slurry in the towers must, therefore, be carefully controlled to avoid the formation of magnesium monosulphite in excess of its solubility in the liquor. In practical operation, it has been found that the reaction proceeds without the formation of magnesium monosulphite in excess of its solubility in the liquor, provided the absorption operates within a pH range of 4.0 to 4.5.

It has been found desirable to feed the slurry of magnesium oxide and water at a substantially fixed rate. The furnace gases from the burning of the waste liquor are very low in sulphur dioxide concentration, carrying approximately 1% of sulphur dioxide under usual conditions. Moreover, the volume of such gases available is variable over a wide range. Hence we have the problem of keeping the acidity of the reaction materials substantially constant and within the range of 4.0 to 4.5.

It is the object of the present invention to control the regeneration of magnesium bisulphite more effectively and thus to ensure continuous and efficient operation of the absorption plant.

Another object of the invention is the utilization of available sulphur dioxide gas which may otherwise escape and pollute the atmosphere.

Other objects and advantages of the invention will be apparent as it is better understood by reference to the following specification and the accompanying drawing, in which the figure is a diagrammatic representation of an apparatus suitable for the practice of the invention.

Referring to the drawing, 5, 6 and 7 represent absorption towers of suitable construction to withstand the corrosive effect of the materials employed therein. Three towers are normally used, but more or less can be used.

The gases from the waste liquor furnaces (not shown) including sulphur dioxide, are delivered through a pipe 8 to the bottom of the tower 5 and pass upwardly therethrough countercurrent to the flow of a slurry of magnesium oxide and water supplied through the pipe 9. This slurry is circulated by withdrawing it through the pipe 10 and a circulating pump 11 which returns the slurry through the pipe 9 to the absorption tower 5. The gases escaping from the top of the absorption tower 5 are delivered through a pipe 12 to the bottom of the absorption tower 6, in which they pass upwardly in contact with a slurry of magnesium oxide and water supplied through a pipe 13. The slurry is withdrawn at the bottom of the tower 6 through a pipe 14 and a circulating pump 15 and returned through the pipe 13 to the tower 6. The gases escaping from the top of the tower 6 are delivered through a pipe 16 to the bottom of the tower 7 and pass upwardly in contact with a slurry of magnesium oxide and water supplied through the pipe 17. The slurry is withdrawn through a pipe 18 and a circulating pump 19 and returned through the pipe 17 to the tower 7. Spent gases are relieved to the atmosphere through a pipe 20 from the top of the tower 7.

The magnesium oxide slurry produced by mixing magnesium oxide with water is introduced through a pipe 21 having branches 22, 23 and 24, so that each of the towers 5, 6 and 7 is supplied continuously with fresh magnesium oxide in the form of a slurry. Additional water, when necessary, is introduced through a pipe 25 into the slurry circulating in the tower 7, and a portion of the circulating slurry is withdrawn through a pipe 26 and delivered through the pipe 14 into the tower 6. Similarly a portion of the slurry circulating in the tower 6 is withdrawn through a pipe 27 and delivered to the pipe 10 and thence to the tower 5.

It is thus apparent that the gases containing sulphur dioxide are subjected successively to contact with slurry in towers 5, 6 and 7 so that substantially all of the sulphur dioxide is absorbed and converted with the magnesium oxide into magnesium bisulphite. The system up to this point operates substantially as in the Palmrose Patent No. 2,351,780, and the advantages of such operation are fully set forth in that patent.

However, as indicated, it has been discovered that in order to avoid the formation of magnesium monosulphite in excess of its solubility in the liquor in the towers 5, 6 and 7, it is necessary to maintain the pH of the solution within the limited range of 4.0 to 4.5. Since the magnesium oxide slurry is introduced to the towers 5, 6 and 7 at a substantially uniform rate, any unusual drop in the quantity of gases supplied from the waste liquor furnaces or in the amount of sulphur dioxide contained therein would result in an increase in the pH of the solutions in the towers 5, 6 and 7, with a consequent tendency to precipitate magnesium monosulphite. To avoid this difficulty, a supply of additional sulphur dioxide is provided and introduced to the pipe 8 through a pipe 28. A valve 29 permits control of the amount of additional sulphur dioxide supplied so that the solutions in the absorption towers 5, 6 and 7 may be held readily within the desired pH range, regardless of the quantity and quality of gas supplied from the waste liquor furnaces through the pipe 8. Thus, it is possible to regulate precisely the pH conditions in the towers 5, 6 and 7 and to ensure efficient operation of the absorption plant, avoiding deposition of magnesium monosulphite in the towers.

The additional sulphur dioxide may be supplied from any source. A convenient source is available in the vent gas from the fortifying tower 30. The magnesium bisulphite solution produced in the tower 5 is withdrawn continuously from the pipe 9 through a pipe 31, thence through a filter 32 which removes any solid material. The liquor is delivered through a pipe 33 to the top of the tower 30. Sulphur dioxide from a sulphur burner, for example (not shown), is introduced through a pipe 34 to the bottom of the tower 30 and passes upwardly in contact with the descending liquor to increase the proportion of free sulphur dioxide in the liquor, making it effective as a cooking liquor in the digesters. Some of this gas is not absorbed and passes out from the top of the tower, to which the pipe 28 may be connected. The vent gas, which otherwise would be discharged to the atmosphere, is thus utilized, and as a result two advantages are secured. First, the regulation of the pH in the towers 5, 6 and 7; and second, the utilization of the sulphur dioxide which otherwise would be wasted. It has been found that the vent gas from the tower 30 contains enough sulphur dioxide to properly fortify the gases from the waste liquor furnaces to the point where the formation of magnesium monosulphite in excess of its solubility in the liquor is prevented by maintaining the proper pH range in the towers 5, 6 and 7, and that by manipulating the valve 29 more or less of this vent gas can be delivered to and mixed with the gases from the waste liquor furnaces so that the pH range in the towers 5, 6 and 7 can readily be maintained at the optimum.

The fortified magnesium bisulphite liquor is withdrawn through a pipe 35 at the bottom of the tower 30 and delivered to storage for ultimate use as a cooking liquor.

The procedure as described is the result of practical operation of the absorption system in a pulp plant employing magnesium bisulphite cooking liquor and has proved to be a practical solution of the problem of regenerating the magnesium bisulphite liquor without contamination or difficulty arising from precipitation of magnesium monosulphite during the reaction of the sulphur dioxide with the magnesium oxide in the towers.

Except in the manner outlined, it is extremely difficult to react the sulphur dioxide with magnesium oxide without forming more or less magnesium monosulphite in excess of its solubility in the liquor. Such excess, being insoluble, causes a loss of magnesium oxide and sulphur dioxide and clogs the system, reducing its efficiency and requiring dismantling of equipment and cleaning thereof at frequent intervals.

Various changes may be made in the procedure within the limits of the appended claims, without departing from the invention or sacrificing the advantages thereof.

I claim:

1. In the method of producing magnesium bisulphite liquor by absorption of sulphur dioxide from waste liquor furnace gases normally containing a concentration of sulphur dioxide of the order of 1% in a slurry of magnesium oxide and water, the improvement consisting of controlling the pH of the resulting liquor within a range of 4.0 to 4.5 by introducing regulated amounts of sulphur dioxide from an extraneous source to the waste liquor furnace gases before absorption thereof and thereby preventing the formation of insoluble magnesium monosulphite.

2. In the method of producing magnesium bisulphite liquor by absorption of sulphur dioxide from waste liquor furnace gases normally containing a concentration of sulphur dioxide of the order of 1% in a slurry of magnesium oxide and water and subsequently fortifying the liquor by absorption of sulphur dioxide, the improvement consisting of controlling the pH of the resulting liquor within a range of 4.0 to 4.5 by introducing regulated amounts of residual sulphur dioxide which is not absorbed in the fortifying operation to the waste liquor furnace gases before absorption thereof and thereby preventing the formation of insoluble magnesium monosulphite.

SVARRE E. HAZELQUIST.

REFERENCES CITED

The following references are of record in the file of this patent:

UNITED STATES PATENTS

| Number | Name | Date |
|---|---|---|
| 1,303,314 | Hinze | May 13, 1919 |
| 2,047,627 | Haglund | July 14, 1936 |
| 2,238,456 | Tomlinson | Apr. 15, 1941 |
| 2,351,780 | Palmrose | June 20, 1944 |
| 2,385,955 | Tomlinson | Oct. 2, 1945 |